Patented May 30, 1933

1,911,780

UNITED STATES PATENT OFFICE

ABRAHAM WHITE, OF BOSTON, MASSACHUSETTS, AND PER K. FROLICH, OF ELIZABETH, NEW JERSEY, ASSIGNORS TO STANDARD OIL DEVELOPMENT COMPANY, A CORPORATION OF DELAWARE

PROCESS FOR PURIFYING GASES

No Drawing.   Application filed March 24, 1930. Serial No. 438,651.

The present invention relates to the art of purifying hydrocarbon mixtures and more specifically comprises an improved process for removing free hydrogen from its mixtures with hydrocarbon gases. The process will be fully understood from the following description.

It is frequently desirable to remove small or even considerable quantities of free hydrogen from its mixtures with other gases such as hydrocarbon and particularly hydrocarbons containing a large amount of olefins so as to prevent saturation in any subsequent operations. Physical means of separation, such as liquefaction and distillation are expensive and undesirable, particularly when relatively small quantities of hydrogen are present.

The present invention comprises a means of removing free hydrogen from mixtures with hydrocarbons both saturated of unsaturated, or indeed other types of combustible gases, without any substantial removal or modification of such combustible constituents.

We have found that under certain conditions hydrogen even if present in relatively large quantities burns with air or oxygen and without any substantial combustion of the other combustible constituents such as hydrocarbons, both saturated and unsaturated. In the practice of our invention the gas to be treated is mixed with substantially the theoretical amount of oxygen, either in the form of air or as oxygen and the gaseous mixture is passed over certain catalytic agents, the nature of which will be disclosed below, at temperatures which vary somewhat with the activity of the catalyst as will be disclosed below.

Our process may be carried out at atmospheric or higher pressures and it is desirable to conduct the process continuously, passing the stream of gas to be treated continuously through a bed or tube filled with the catalytic agent and continuously withdrawing the purified product.

As catalytic agents we have successfully used certain metals and metal oxides and it appears that if the metal is used, temperatures from about 300 to 450° C. are desirable, while if the oxides are used, lower temperatures, say from 200° to 350° C. are more satisfactory. The combustion of the hydrogen produces a marked evolution of heat proportional to the quantity of hydrogen to be removed, as will be readily appreciated and it is desirable to provide adequate means for removing the heat and preventing undue rises in temperature locally in the catalyst bed. This may be done in any desirable manner for example; if small tubes are used the ordinary radiation loss is frequently sufficient and if not, the catalyst tube may be fitted with fins or other heat radiating means. With large tubes where relatively large volumes of gases are to be treated, internal cooling with steam or with the inlet gases is desirable, as will be understood.

In our process we have found that copper shot or copper oxide are the most satisfactory and efficient, but other materials, such as lead, nickel, tin, bismuth, iron or their oxides or other equivalent metals whose oxides are readily reducible by hydrogen within the specified temperature range, or their oxides or mixtures or alloys containing these substances, such as brass or alloys of iron, may be used. It is desirable to purify the gases of sulphurous constituents, either by soda wash or by equivalent means since the presence of sulphur in the gases gradually poisons the catalytic agent.

As an example of the operation of the process, a cracked gas of the following composition is mixed with the theoretical quantity of oxygen to completely remove free hydrogen and is then passed through the catalytic chamber filled with the catalytic agent:

|   | Percent |
|---|---|
| $C_3H_6$ | 10 |
| $C_2H_4$ | 27 |
| $H_2$ | 31.5 |
| $CH_4 + C_2H_6$ | 31.2 |

In one case the catalytic agent comprises copper shot and the temperature is maintained at about 400° C. The outlet gas has the following composition:

| | Percent |
|---|---|
| $C_3H_6$ | 14 |
| $C_2H_4$ | 32 |
| $CH_4 + C_2H_6$ | 45 |
| $H_2$ | 5.5 |
| $CO_2$ | 2.4 |
| $CO$ | 1.2 |

It will be observed that substantially all of the hydrogen has been oxidized to water with practically no destruction of hydrocarbons.

In the second case similar gas mixture was mixed with sufficient air to completely burn the free hydrogen and this mixture was passed through a catalytic zone containing copper oxide and maintained at about 275° C. The outlet gas has the following composition:

| | Percent |
|---|---|
| $C_3H_6$ | 7.4 |
| $C_2H_4$ | 17.0 |
| $CH_4 + C_2H_6$ | 24.6 |
| $CO_2$ | 6.1 |
| $CO$ | 0.6 |
| $H_2$ | 0.0 |
| $N_2$ | 44.3 |

Although other metals given above and their oxides may be used we prefer to use either copper oxide or copper shot.

Our invention is not to be limited by any theory of the mechanism of the reactions nor to any specific example which may have been given for purpose of illustration, but only by the following claims in which we wish to claim all novelty inherent in our invention.

We claim:

1. An improved process for selectively removing free hydrogen from its gaseous mixtures containing other combustible constituents without substantial change in the latter which comprises passing the gas in admixture with a gas containing free oxygen over a suitable catalyst, containing materials selected from the class consisting of metals and metal oxides whose oxides are reducible by hydrogen at operating conditions, maintained at a suitably elevated reaction temperature between approximate limits of 200 to 450° C.

2. Process according to claim 1 in which hydrogen is removed from gases containing hydrocarbon constituents.

3. Process according to claim 1 in which hydrogen is removed from gas mixtures containing unsaturated hydrocarbons.

4. Process according to claim 1 in which the amount of oxygen is sufficient to unite with substantially all of the free hydrogen.

5. An improved process for preferential oxidation of free hydrogen from its mixtures with hydrocarbon gases without substantial change in the hydrocarbons comprising passing such gas in admixture with an amount of free oxygen not greater than that required for reaction with the free hydrogen over a catalyst containing a metal whose oxide is readily reducible by hydrogen at an elevated temperature between approximate limits of 300 to 450° C.

6. Process according to claim 5 in which the catalyst contains copper.

7. Process according to claim 5 in which the catalyst comprises copper and the temperature is within the limits of 300 to 450° F.

8. An improved process for preferentially removing free hydrogen from a gaseous mixture containing it and saturated and unsaturated hydrocarbons without substantial change in the hydrocarbons which comprises passing the gas in admixture with free oxygen in an amount not greater than that required for reaction with the free hydrogen over a catalyst comprising a metal oxide reducible by hydrogen at the operating conditions at a temperature between approximate limits of 200 to 450° C.

9. Process according to claim 8 in which the catalyst is copper oxide.

10. Process according to claim 8 in which the catalyst is copper oxide and the temperature is between the limits of 200 and 350° C.

11. Process according to claim 8 in which the catalyst is a metal whose oxide is reducible by hydrogen at the operating conditions.

12. Process according to claim 8 in which the catalyst is copper and temperature is between the approximate limits of 300 to 450° C.

13. Process according to claim 8 in which air is added to supply the free oxygen.

ABRAHAM WHITE.
PER K. FROLICH.